(No Model.)
I. L. ROBERTS.
CARBON ELECTRODE AND METHOD OF MAKING THE SAME.
No. 442,336. Patented Dec. 9, 1890.
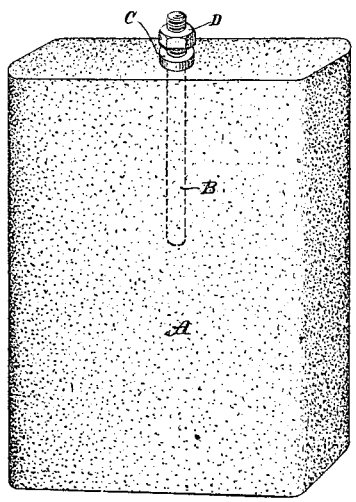
Witnesses:
Raphael Netter
Ernest Hopkinson
Inventor
Isaiah L. Roberts
by Duncan, Curtis & Page
Attorneys.

UNITED STATES PATENT OFFICE.

ISAIAH L. ROBERTS, OF BROOKLYN, ASSIGNOR OF ONE-HALF TO THOMAS H. McGRAW, OF POUGHKEEPSIE, NEW YORK.

CARBON ELECTRODE AND METHOD OF MAKING THE SAME.

SPECIFICATION forming part of Letters Patent No. 442,336, dated December 9, 1890.

Application filed February 14, 1890. Renewed October 22, 1890. Serial No. 368,974. (No model.)

*To all whom it may concern:*

Be it known that I, ISAIAH L. ROBERTS, a citizen of the United States, residing at Brooklyn, in the county of Kings and State of New York, have invented certain new and useful Improvements in Carbon Electrodes, of which the following is a specification.

This invention relates to the manufacture of carbon electrodes for galvanic batteries and electrolytic apparatus, the object being to provide economically an electrode of better conducting quality which is practically indestructible, and also to provide a better means of connecting the same with a circuit-conductor.

Carbon electrodes for batteries and analogous purposes have heretofore been made in substantially the following manner: The carbon of the desired kind is finely divided or reduced to a powder. This is made into a plastic mass by sirup, pitch, tar, asphaltum, or some other similar binding substance which is a carbonizable non-conductor. The plastic mass is then molded into any desired shapes and the whole is carbonized. Before carbonization, however, the viscous binding material surrounds the particles of carbon so completely as to render the mass practically non-conducting. The subsequent exposure to a high temperature is necessary to carbonize the binding material itself and to thereby convert the whole into a conductor of electricity. Carbons made in this manner are expensive, the increased cost being mainly due to the process of carbonization, which, in order that the electrodes shall be of low resistance and homogeneous, must be very complete and sometimes repeated a number of times, the carbon after each baking being saturated with a carbonizable fluid, such as a sirup or the like. Another objectionable quality which I have observed in all carbons made by such processes is their tendency under certain circumstances to disintegrate—for example, when used as anodes in an electrolytic tank, in which chlorine gas is set free by electrolytic action. It has also been proposed to make a battery-electrode by mixing together powdered graphite and sulphur in equal parts by heating the mixture until it becomes fluid, and then pouring it into a mold; but carbons made in this way have a high resistance and are not in any respect suited to such purposes as electrolysis, in which the lowest possible resistance is required.

The specific object of my invention is to manufacture a solid homogeneous electrode or plate of carbon which will be a good conductor of electricity and not subject to the disintegrating action of any chemical substance, and for this purpose I employ as the binding material for the powdered or finely-divided carbon a substance which is liquefied by heat, but which becomes a solid on cooling. Such substances are non-conductors, and their condition in this respect is never altered in the composite mass, which is not subjected to any subsequent carbonization, the requisite conductibility being secured by pressure, by which the particles of carbon are forced into intimate mechanical and electrical contact.

In detail the process of manufacture which I follow in producing my new carbon plates or electrodes is as follows: I comminute or reduce to a fine powder carbon, preferably plumbago or gas-retort carbon, and add to the powder a quantity of paraffine or ozocerite, in proportions which may greatly vary, as will be hereinafter seen. I then heat the mass until the paraffine is melted into a thin fluid, and I then mix it thoroughly with the powdered carbon. While it is still hot the mixture is molded into the desired shapes of plates or bars under a pressure sufficiently high to force the particles of carbon into intimate contact and to express all excess of the paraffine. The forms are then allowed to cool, preferably under pressure, and when the paraffine becomes hard they are ready for immediate use. A number of substances other than those named may be employed as the binding material—such as sulphur, chloride of lead, and others—which are reduced to a liquid condition by heat, and which on cooling return to a solid condition. I use the term "liquid" in this connection as distinguished from the broader term "fluid," and in its proper significance as implying a perfectly mobile state, and from the more restricted term "viscous," and as expressing a condition which permits the surplus or excess of the binding material to be expressed by pressure.

An ordinary viscous fluid could not be used in making my carbons, even though it solidified on cooling, for it would not permit the carbon particles to be forced into actual contact, since practically the whole amount incorporated with the carbon would remain in the mass and could not be squeezed out.

This invention enables me to embed metallic terminals or connectors in the carbon electrode, which is not practicable, if possible, with ordinary electrodes, since the necessary heat for the carbonization of the ordinary carbons would fuse or oxidize the metal. In my process of manufacture, however, I have only to mold an electrode around a metallic pin or post, and by applying sufficient pressure to force the carbon particles into contact with the metal I secure good electrical connection. These electrodes, as above stated, may be made in any shape or form desired and may be used for any purpose where they will not be softened by heat.

In the drawing hereto annexed I have shown an electrode made in accordance with my invention.

A is a block or plate of powdered carbon solidified by ozocerite, paraffine, or other substance, as above described. It is molded by any suitable apparatus that will apply sufficient pressure to express the surplus binding material.

A connector, which may be an iron or copper post, is laid in the carbon mixture in the mold, and the mixture is then compressed around it by the plunger or other device. The connector is represented by B and has a shoulder C and a threaded end, on which fits a nut D, such as is usually employed with these devices.

What I claim is—

1. The method or process of manufacturing carbon electrodes, which consists in mixing together powdered carbon and an insulating binding material, such as paraffine or its equivalent, heating the mixture to fuse the insulating material, then subjecting the mixture to pressure in a mold to express the excess of insulating material, and then cooling it.

2. An electrode consisting of a compressed or firmly-compacted block of finely-divided carbon and paraffine or its described equivalent.

In testimony whereof I have hereunto set my hand this 11th day of February, 1890.

ISAIAH L. ROBERTS.

Witnesses:
PARKER W PAGE,
MARCELLA G. TRACY.